US 8,219,080 B2

(12) United States Patent
Sokondár (10) Patent No.: US 8,219,080 B2
(45) Date of Patent: Jul. 10, 2012

(54) METHODS AND APPARATUS FOR PRODUCING A USER-CONTROLLED PLMN LIST FOR A SIM/USIM CARD WITH USE OF A USER AGENT APPLICATION

(75) Inventor: Enikö Sokondár, Richmond (GB)

(73) Assignee: Research In Motion Limited, Waterloo, Ontario (CA)

( * ) Notice: Subject to any disclaimer, the term of this patent is extended or adjusted under 35 U.S.C. 154(b) by 1275 days.

(21) Appl. No.: 11/414,243

(22) Filed: Apr. 28, 2006

(65) Prior Publication Data

US 2007/0254646 A1 Nov. 1, 2007

(51) Int. Cl.
*H04W 4/00* (2009.01)
(52) U.S. Cl. ............... 455/432.1; 455/433; 455/434; 455/435.2; 455/435.3
(58) Field of Classification Search ............. 455/432.1, 455/433, 434, 435.2, 435.3
See application file for complete search history.

(56) References Cited

U.S. PATENT DOCUMENTS

| 5,442,806 | A | 8/1995 | Barber et al. |
| 5,734,980 | A | 3/1998 | Hooper et al. |
| 5,903,832 | A | 5/1999 | Seppanen et al. |
| 6,415,148 | B1 | 7/2002 | Chiniga et al. |
| 6,567,663 | B1 | 5/2003 | Otting et al. |
| 7,027,813 | B2 | 4/2006 | Hicks et al. |
| 7,096,015 | B2 | 8/2006 | Bridges et al. |
| 7,139,570 | B2 * | 11/2006 | Elkarat et al. ............ 455/432.3 |
| 7,689,218 | B2 * | 3/2010 | Jiang et al. ............ 455/435.2 |

| 2002/0087674 | A1 | 7/2002 | Guilford et al. |

(Continued)

FOREIGN PATENT DOCUMENTS

FR 2862838 A1 5/2005

(Continued)

OTHER PUBLICATIONS

European Search Report for Application # 06252300.6-2412, Oct. 9, 2006.

*Primary Examiner* — Rafael Pérez-Gutiérrez
*Assistant Examiner* — Liton Miah
(74) *Attorney, Agent, or Firm* — John J. Oskorep, Esq.

(57) ABSTRACT

Methods and apparatus for producing a user-controlled PLMN list for a SIM/USIM card with use of a user agent application are disclosed. Selection indication data corresponding to at least one of a plurality of network attribute type preferences is received at the user agent application. The selection indication data may be received through a user interface of the user equipment, a user application of the user equipment, or both. The at least one selected network attribute type preference is indicative of a preference to prioritize network selection based on at least one network attribute type of a plurality of network attributes types (e.g. cost, bandwidth, quality, number of available features, etc.). A list of network identifications associated with a plurality of wireless communication networks is ranked in accordance with a ranking of network attributes of the at least one selected network attribute type made available by the plurality of wireless communication networks. The ranked list of network identifications is then stored as a user-controlled PLMN list in the SIM/USIM. An automatic network selection process may then be performed with use of the user-controlled PLMN list. As apparent, network selection may be controlled and facilitated by the end user in a more conceptual fashion. Other additional and alternative advantageous features are described in the detailed description.

12 Claims, 7 Drawing Sheets

U.S. PATENT DOCUMENTS

| | | |
|---|---|---|
| 2002/0119774 A1 | 8/2002 | Johannesson et al. |
| 2003/0020726 A1 | 1/2003 | Charpentier |
| 2003/0134637 A1* | 7/2003 | Cooper .................. 455/432 |
| 2004/0077337 A1 | 4/2004 | Vestergaard et al. |
| 2004/0109431 A1 | 6/2004 | Abrahamson et al. |
| 2004/0192306 A1* | 9/2004 | Elkarat et al. ............. 455/435.2 |
| 2005/0003816 A1* | 1/2005 | Vardoulias et al. ........ 455/435.2 |
| 2005/0101323 A1 | 5/2005 | De Beer |
| 2006/0075090 A1 | 4/2006 | Bocking et al. |
| 2006/0077926 A1* | 4/2006 | Rune ........................ 370/328 |
| 2006/0160537 A1 | 7/2006 | Buckley et al. |

FOREIGN PATENT DOCUMENTS

WO        2005067334 A1    7/2005

* cited by examiner

METHODS AND APPARATUS FOR PRODUCING A USER-CONTROLLED PLMN LIST FOR A SIM/USIM CARD WITH USE OF A USER AGENT APPLICATION

BACKGROUND

1. Field of the Technology

The present invention relates generally to wireless network selection techniques for mobile stations operating in wireless communication networks, and more particularly to methods and apparatus for producing user-controlled public land mobile network (PLMN) lists with a user agent application in such mobile stations.

2. Description of the Related Art

End users of user equipment have difficulties understanding telecommunications concepts and therefore have difficulties in configuring their user equipment appropriately. For example, it is difficult for end users to understand how to control the network selection procedure in their user equipment in order to achieve the best results. Due to this lack of knowledge, end users cannot effectively exploit all possible communication services offered to them.

Accordingly, what are needed are methods and apparatus which overcome the deficiencies of the prior art.

SUMMARY

Methods and apparatus for producing a user-controlled public land mobile network (PLMN) list for a Universal Integrated Circuit Card (UICC) having a Subscriber Identity Module (SIM) or Universal Subscriber Identity Module (USIM) with use of a user agent application are described. Selection indication data corresponding to at least one of a plurality of network attribute type preferences is received at the user agent application. The selection indication data may be received through a user interface of the user equipment, a user application of the user equipment, or both. The at least one selected network attribute type preference is indicative of a preference to prioritize network selection based on at least one network attribute type of a plurality of network attributes types (e.g. cost, bandwidth, quality, number of available features, etc.). A list of network identifications associated with a plurality of wireless communication networks is ranked in accordance with a ranking of network attributes of the at least one selected network attribute type made available by the plurality of wireless communication networks. The ranked list of network identifications is then stored as a user-controlled PLMN list in the SIM/USIM. An automatic network selection process may then be performed with use of the user-controlled PLMN list. As apparent, network selection may be controlled and facilitated by the end user in a more conceptual fashion. Other additional and alternative advantageous features are described in the detailed description.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Methods and apparatus for producing a user-controlled public land mobile network (PLMN) list for a Universal Integrated Circuit Card (UICC) loaded with a Subscriber Identity Module (SIM) or a Universal Subscriber Identity Module (USIM) (hereinafter "SIM/USIM card") with use of a user agent application are described. Selection indication data corresponding to at least one of a plurality of network attribute type preferences is received at the user agent application. The selection indication data may be received through a user interface of the user equipment, a user application of the user equipment, or both. The at least one selected network attribute type preference is indicative of a preference to prioritize network selection based on at least one network attribute type of a plurality of network attributes types (e.g. cost, bandwidth, quality, number of available features, etc.). A list of network identifications associated with a plurality of wireless communication networks is then ranked in accordance with a ranking of network attributes of the at least one selected network attribute type made available by the plurality of wireless communication networks. The ranked list of network identifications is then stored as a user-controlled PLMN list in the SIM/USIM card. An automatic network selection process may then be performed with use of the user-controlled PLMN list. As apparent, network selection may be controlled and facilitated by the end user in a more conceptual fashion. Other additional and alternative advantageous features are described in the detailed description.

Figure 1:
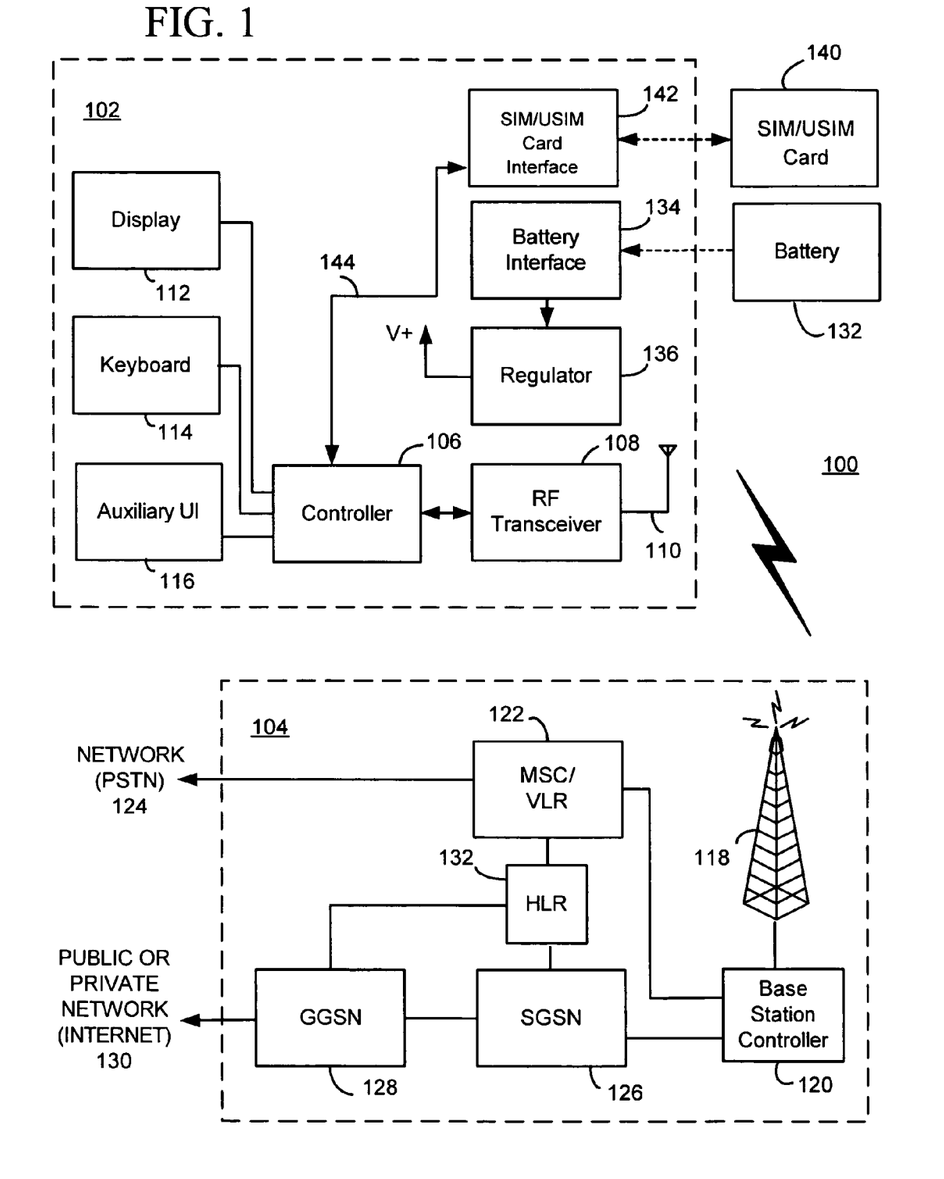
FIG. 1 is a block diagram which illustrates pertinent components of a user equipment and a wireless communication network.

To illustrate general components for communications, FIG. 1 is a block diagram of a communication system 100 which includes a mobile station 102 (one type of user equipment, wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and Base Station Controller BSC 120, including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 134 provides for a mechanical and electrical connection for battery 132. Battery interface 134 is coupled to a regulator 136 which regulates power V+ to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a SIM/USIM card 140 which is connected to or inserted in mobile station 102 at a SIM/USIM card interface 142. A SIM/USIM card 140 is a Universal Integrated Circuit Card (UICC) loaded with a Subscriber Identity Module (SIM) or a Universal Subscriber Identity Module (USIM) application. SIM/USIM card 140 is one type of a removable identity card or "smart card" used to identify an end user (or subscriber) of mobile station 102 and to personalize the device, among other things. Without SIM/USIM card 140, the mobile device may be referred to as mobile equipment (ME); with SIM/USIM card 140, the mobile device may be referred to as user equipment (UE). By inserting SIM/USIM card 140 into mobile station 102, an end user can have access to any and all of his/her subscribed services. Without SIM/USIM card 140, the mobile station terminal is not fully operational for communication through wireless network 104. SIM/USIM card 140 generally includes a processor and memory for storing information. Since SIM/USIM card 140 is coupled to SIM/USIM card interface 142 (which may be referred to as a removable identity card interface), it is coupled to controller 106 through communication lines 144. In order to identify the subscriber, SIM/USIM card 140 contains some user parameters such as an International Mobile Subscriber Identity (IMSI). An advantage of using SIM/USIM card 140 is that end users are not necessarily bound by any single physical mobile station. SIM/USIM card 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. Wireless communication network 104 may be a cellular telecommunications network. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN 126, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
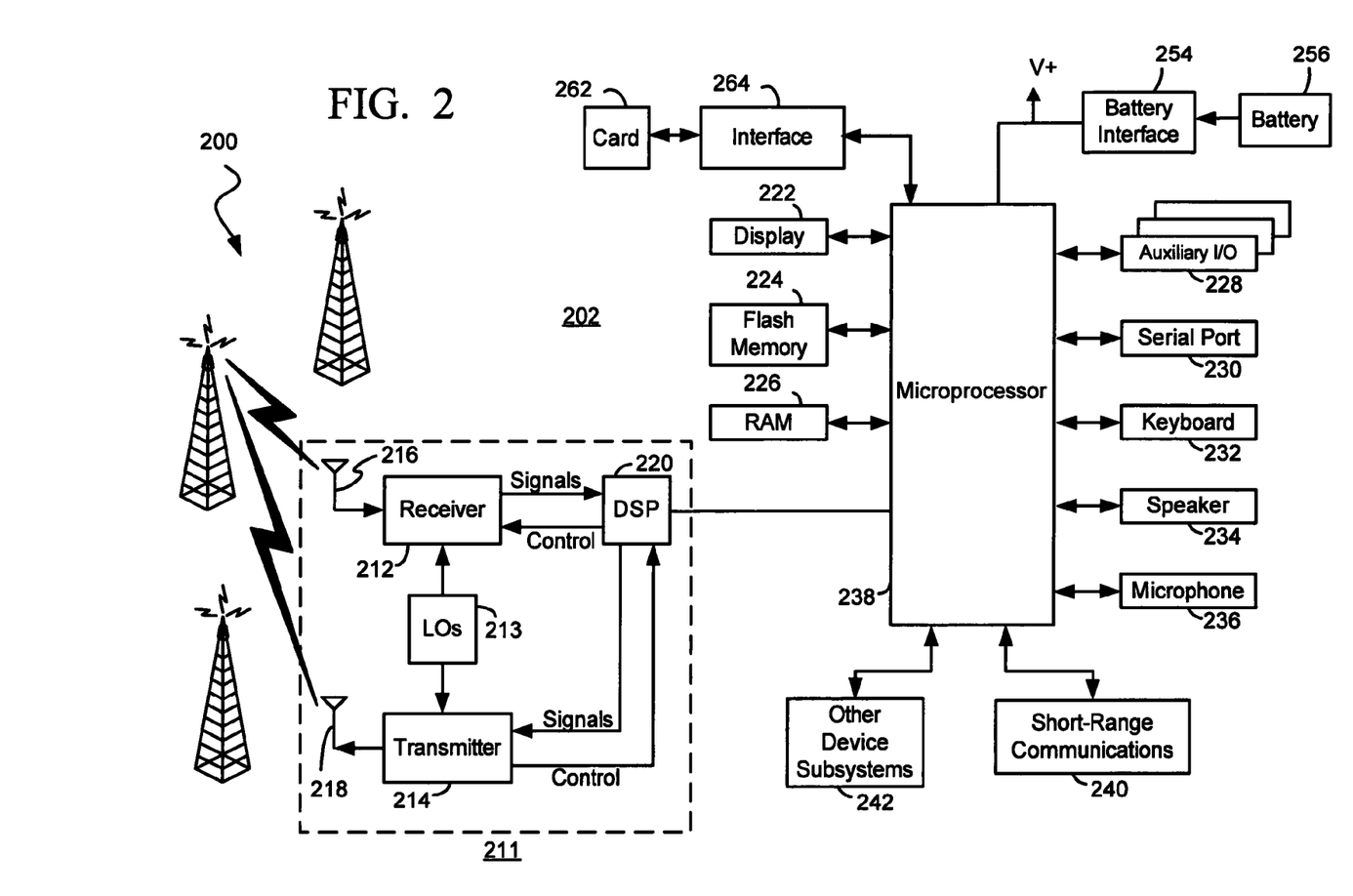
FIG. 2 is a more detailed diagram of the preferred user equipment of FIG. 1.

FIG. 2 is a detailed block diagram of a preferred mobile station 202 of the present application. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a SIM/USIM card 262 to be inserted in a SIM/USIM interface 264 in order to operate in the network. SIM/USIM card 262 includes those features described in relation to FIG. 1. Again, without SIM/USIM card 262, the mobile device may be referred to as mobile equipment (ME); with SIM/USIM card 262, the mobile device may be referred to as user equipment (UE). Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as the network identification list creation techniques of the present application, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM/USIM card 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
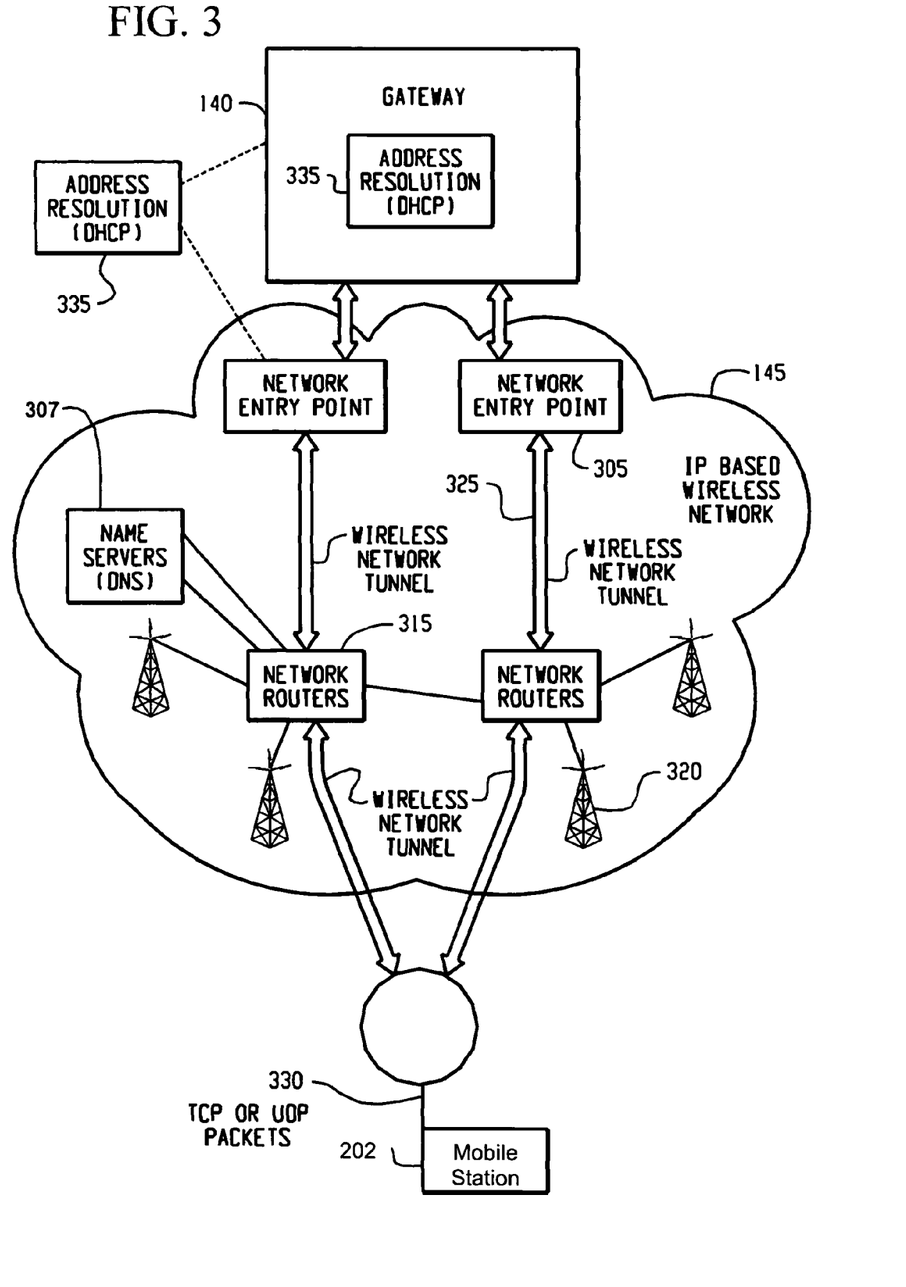
FIG. 3 is a system structure which helps provide data communication services for the user equipment in the wireless network of FIGS. 1 and 2.

FIG. 3 shows a system structure which helps provide data communication services for the mobile station. In particular, FIG. 3 shows basic components of an IP-based wireless data network which may be utilized. Mobile station 202 of FIG. 3 communicates with a wireless packet data network 145, and may also be capable of communicating with a wireless voice network (not shown). As shown in FIG. 3, a gateway 140 may be coupled to an internal or external address resolution component 335 and one or more network entry points 305. Data packets 330, such as Transmission Control Protocol (TCP) or User Datagram Protocol (UDP) packets, are transmitted from gateway 140, which is source of information to be transmitted to mobile station 202, through network 145 by setting up a wireless network tunnel 325 from gateway 140 to mobile station 202. In order to create this wireless tunnel 325, a unique network address is associated with mobile station 202. In an IP-based wireless network, however, network addresses are typically not permanently assigned to a particular mobile station 202 but instead are dynamically allocated on an as-needed basis. It is thus preferable for mobile station 202 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless packet data network 145 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to mobile stations such as mobile station 202.

Wireless network tunnels such as a wireless tunnel 325 are opened across wireless network 345 in order to allocate necessary memory, routing, and address resources to deliver IP packets. Such tunnels 325 are established as part of what are referred to as Packet Data Protocol or "PDP contexts" (i.e. data sessions). To open wireless tunnel 325, mobile station 202 must use a specific technique associated with wireless network 145. The step of opening such a wireless tunnel 325 may require mobile station 202 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 202 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 202. When an IP address has been allocated to mobile station 202 and communicated to gateway 140, information can then be forwarded from gateway 140 to mobile station 202.

Figure 4:
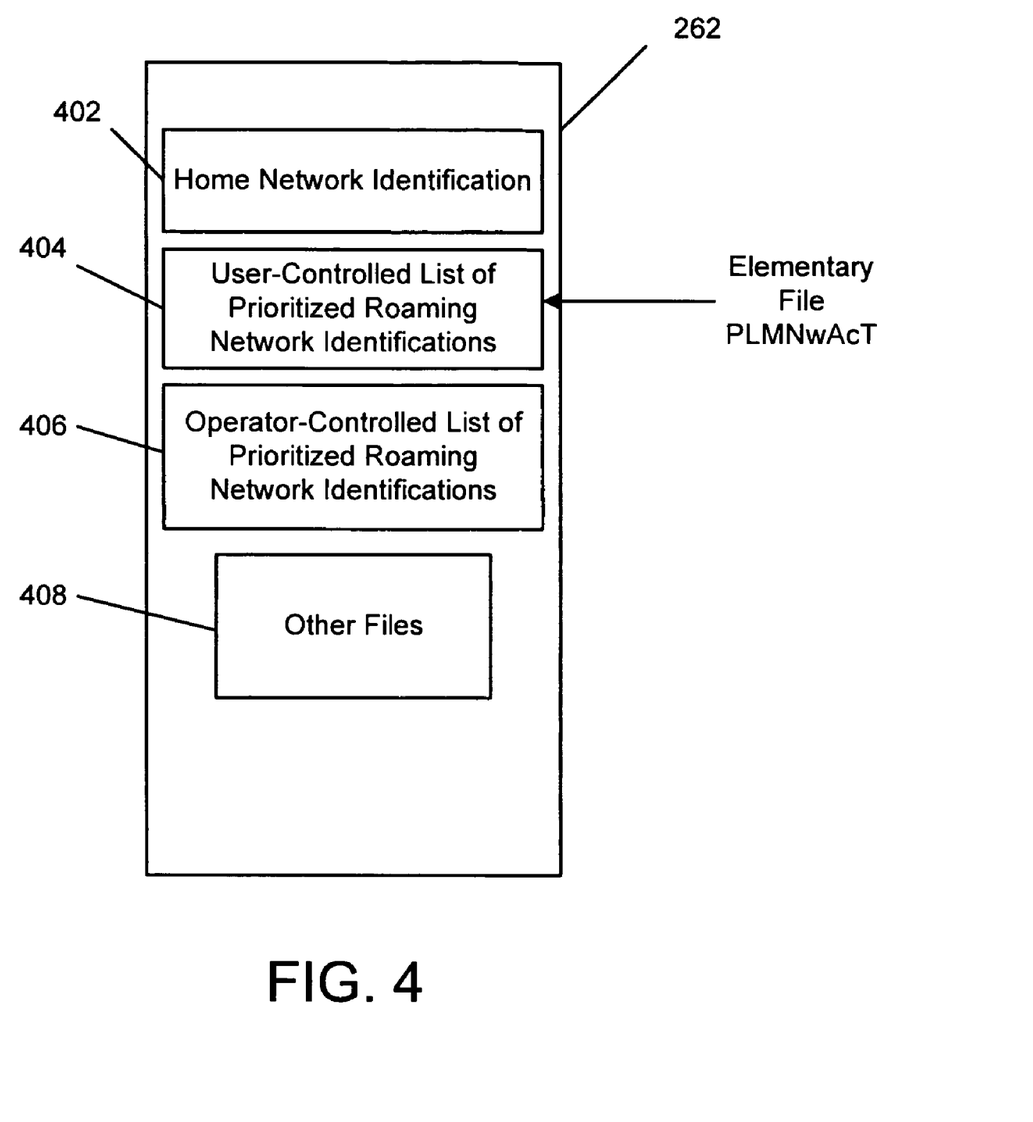
FIG. 4 is an illustration of a Universal Integrated Circuit Card (UICC) of the user equipment loaded with a Subscriber Identity Module (SIM) or Universal Subscriber Identity Module (USIM) application ("SIM/USIM card"), which includes a user-controlled list of prioritized roaming network identifications.

FIG. 4 is an illustration of SIM/USIM card 262 of the user equipment. SIM/USIM card 262 includes a memory for storing a file 402 having a home network identification (or HPLMN identification), a file 404 having a user-controlled list of prioritized roaming network identifications (or user-control PLMN list), a file 406 having an operator-controlled list of prioritized roaming network identifications (or operator-controlled PLMN list), and other various files 408 as known. File 404 of the user-controlled list of prioritized roaming network identifications may be an elementary file (EF) referred to as or named PLMNwAcT or $EF_{PLMNwAcT}$, where PLMNwAcT is an abbreviation/acronym for "user-controlled PLMN selector with access technology." It is the information in this file 404 that is produced in accordance with teachings of the present application. Note that, in the present exemplary description, network identifications may correspond to mobile network code (MNC) and mobile country code (MCC) pairs which are associated with wireless networks which are public land mobile networks (PLMNs).

End users of user equipment have difficulties understanding telecommunications concepts and therefore have difficulties in configuring their user equipment appropriately. For example, it is difficult for end users to understand how to control the network selection procedure in their user equipment in order to achieve the best results. See e.g. specification TS 23.122 on details about PLMN selection. Due to this lack of knowledge, end users cannot effectively exploit all possible communication services offered to them unless something additional is provided for their use.

Figure 5:
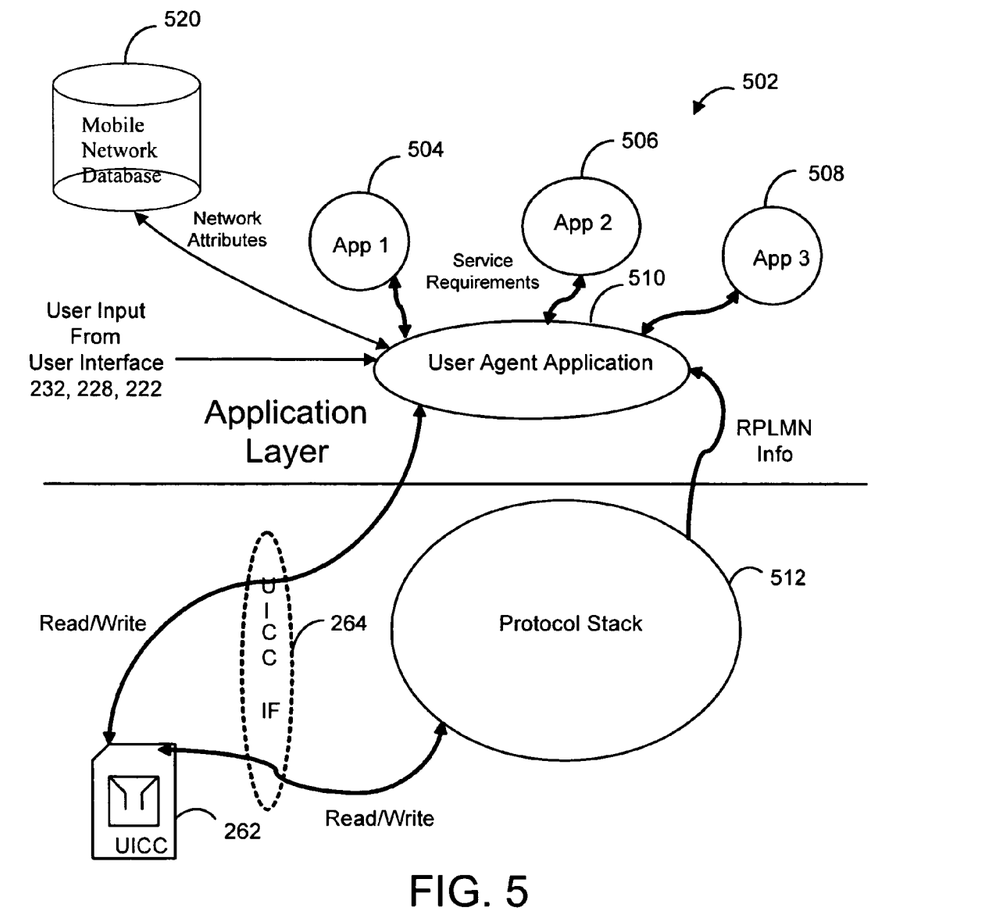
FIG. 5 is an information flow diagram of a system which includes a user agent application for producing the user-controlled list of prioritized roaming network identifications in the SIM/USIM card.

FIG. 5 is an information flow diagram for a system within the user equipment which is designed in accordance with the present application. The information flow diagram shows a user agent application 510, a plurality of user applications 502 (which in this example includes three user applications 504, 506, and 508), a protocol stack 512, SIM/USIM card 262, and SIM/USIM interface 264. User agent application 510 is adapted to produce the user-controlled list of prioritized roaming network identifications based on input data from the user interface of the user equipment and/or the plurality of user applications 502. This user-controlled list will be stored in the $EF_{PLMNwAcT}$ in SIM/USIM card 262 via SIM/USIM interface 264 as described herein (e.g. see FIG. 4). SIM/USIM card 262 and SIM/USIM interface 264 have been described above in relation to FIGS. 1, 2, and 4.

In particular, user input is received through the user interface of the user equipment (e.g. keyboard 232, auxiliary I/O 228, and/or display 222 of FIG. 2; or keyboard 114, auxiliary UI 116, and/or display 112 of FIG. 1) from the end user and is input to user agent application 510. An example of this will be described later in relation to FIG. 6 below. On the other hand, service requirements for each user application 502 is received and input to user agent application 510. The input from the user interface and/or user applications 502 may be input or referred to as selection indication data. This input or selection indication data corresponds to at least one of a plurality of network attribute type preferences which are offered by the user equipment and selectable by the end user. The at least one selected network attribute type preference is indicative of a preference to prioritize network selection based on at least one network attribute type of a plurality of network attributes types. For example, the network attribute type preference may be related to network cost, available bandwidth, quality, the total number of features made available by the network, etc.

As will be described herein in more detail, user agent application 510 utilizes the selection indication data in order to rank a list of network identifications associated with a plurality of wireless communication networks. The ranking is performed in accordance with a ranking of network attributes of the selected network attribute type that are actually made available by the wireless communication networks.

Preferably, the network attributes made available by the wireless communication networks are kept in a mobile network database 520 of FIG. 5 for retrieval and use by all such user equipment. Mobile network database 520 is preferably located and coupled within the (home) wireless communication network of the user equipment. Within mobile network database 520, various network attributes associated with many or most, if not all, wireless networks (e.g. network cost, available bandwidth, quality, available communication features, the total number of features made available by the network, etc.) are stored in association with their corresponding network identifications (e.g. MNC/MCC pairs). The network attributes may be retrieved by the user equipment based on the network identifications when needed. To provide some examples, each wireless network may have one of the following network attributes corresponding to a network attribute type of "monetary cost": "low monetary cost", "medium monetary cost", or "high monetary cost" (or alternatively, for example, each has a specified cost per minute). Each wireless network may have one of the following network attributes corresponding to a network attribute type of "available bandwidth": "low available bandwidth", "medium available bandwidth", and "high available bandwidth" (or alternatively, for example, each has a specified current bandwidth made available).

Once this network attribute information is retrieved, the user equipment may at least temporarily maintain its own local database of network attributes within memory of the user equipment for wireless networks of interest that it encounters. Using these network attributes, the user equipment ranks its list of network identifications in accordance with a ranking of those particular network attributes corresponding to the selected network attribute type made available by the wireless networks.

For example, if the selection indication data indicates a preference to prioritize network selection based solely on monetary cost (e.g. lowest monetary cost prioritization) as input from the end user, for example, then user agent application 510 will rank the list of network identifications from least cost (highest or first priority network) to greatest cost (lowest or last priority network). As another example, if the selection indication data indicates a preference to prioritize network selection based on monetary cost (e.g. lowest monetary cost prioritization) as input from the end user, as well as GPRS service availability (e.g. GPRS availability prioritization) as input from user application 504, then user agent application 510 will rank the list of network identifications from least cost (highest or first priority network) to greatest cost (lowest or last priority network) for those networks that make the GPRS service available, followed by those network identifications from least cost to greatest cost for those networks that do not make the GPRS service available. In this case, user application 504 may be an application that requires user data communication (e.g. GPRS) such as an e-mail communication application or an Internet/Web browser application.

Figure 6:
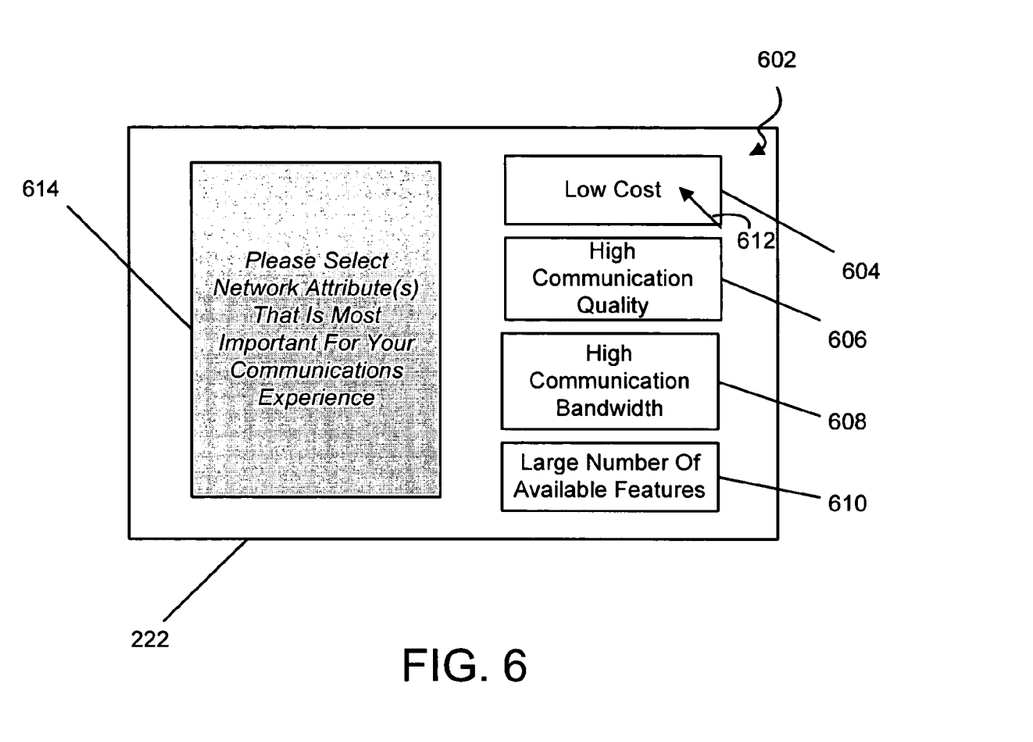
FIG. 6 is an illustration of a user interface (e.g. an input display) of the user equipment which may be used to receive selection indication data corresponding to at least one of a plurality of network attribute type preferences.

FIG. 6 is an illustration of part of a user interface (e.g. display 222 of FIG. 2) of the user equipment which may be used to receive selection indication data corresponding to at least one of the plurality of network attribute type preferences. The indications in display 222 and the following discussion illustrate merely one example of how an end user may provide input for the network selection process according to the present application. In FIG. 6, display 222 generally reveals that the user equipment may provide a graphical user interface (GUI) for the end user to input data and otherwise facilitate the user experience. The GUI is utilized in combination with a keyboard or keypad (e.g. keyboard 232 of FIG. 2) of the user equipment for the end user to enter the appropriate information. A cursor 612 may be moved by the end user through a mouse, scrollwheel, or other selection mechanism, etc., of the user equipment for input selection.

As shown in FIG. 6, display 222 is displaying an instruction 614 and a plurality of input selection options 602 for selection by the end user. The information for instruction 614 and input selection options 602 are generated by the user equipment and provided in display 222 for end user assistance. Input selection options 602 may be referred to or viewed as various input devices of the user equipment, keys or buttons having informative indicia displayed thereon. In this example, instruction 614 indicates to the end user to "Please Select Network Attribute(s) That Is Most Important For Your Communications Experience". Alternative and/or additional instructions may be provided. Also in this example, input selection options 602 reveal a "low cost" selection option 604, a "high communication quality" selection option 606, a "high communication bandwidth" selection option 608, and a "large number of available features" selection option 610. Many other additional and alternative selection options are possible as one skilled in the art readily appreciates (e.g. low-cost voice-only, low-cost SMS messaging, etc.). These input selection options 602 correspond to at least some of the network attribute type preferences offered and made selectable by the user equipment for the end user.

In a configuration process, the end user is presented with such a screen on display 222 as shown in FIG. 6 in order to select preferences for network selection. The end user may select one or more of these selection options 602, which are input to the user agent application (e.g. see FIG. 5). If two or more selection options are selected by the end user, these selection options may be selected or entered in order of importance or priority by the end user. The user agent application may handle two or more preferences as needed. The user agent application is adapted to translate the user input, which is a more conceptual form for the end user, into information usable to configure the network lists.

Referring back to FIG. 5, similar selection preferences or requirements are received from each user application 602 at user agent application 510. For example, the selection requirements may indicate a "voice only" requirement (e.g. for a voice-only telephony application), a "high communication bandwidth" requirement (e.g. for a real-time video application), and a "GPRS" requirement (e.g. for an e-mail communication application or an Internet/Web browser application), as examples. Again, user agent application 510 may handle two or more preferences from both the end user and the user applications as needed. User agent application 510 may suitably handle conflicts by prioritizing application requirements over user preferences, for example.

Preferably, the functionality of user agent application 510 to produce a new list of network identifications is triggered in response to a new user application being invoked by the user equipment or the end user. In addition, the functionality is also triggered in response to the end user performing the configuration process described above in relation to FIG. 6. As apparent, a new list of network identifications may be produced in response to these events so that the best or more preferred wireless network may be chosen for any given application that is being utilized.

Figure 7:
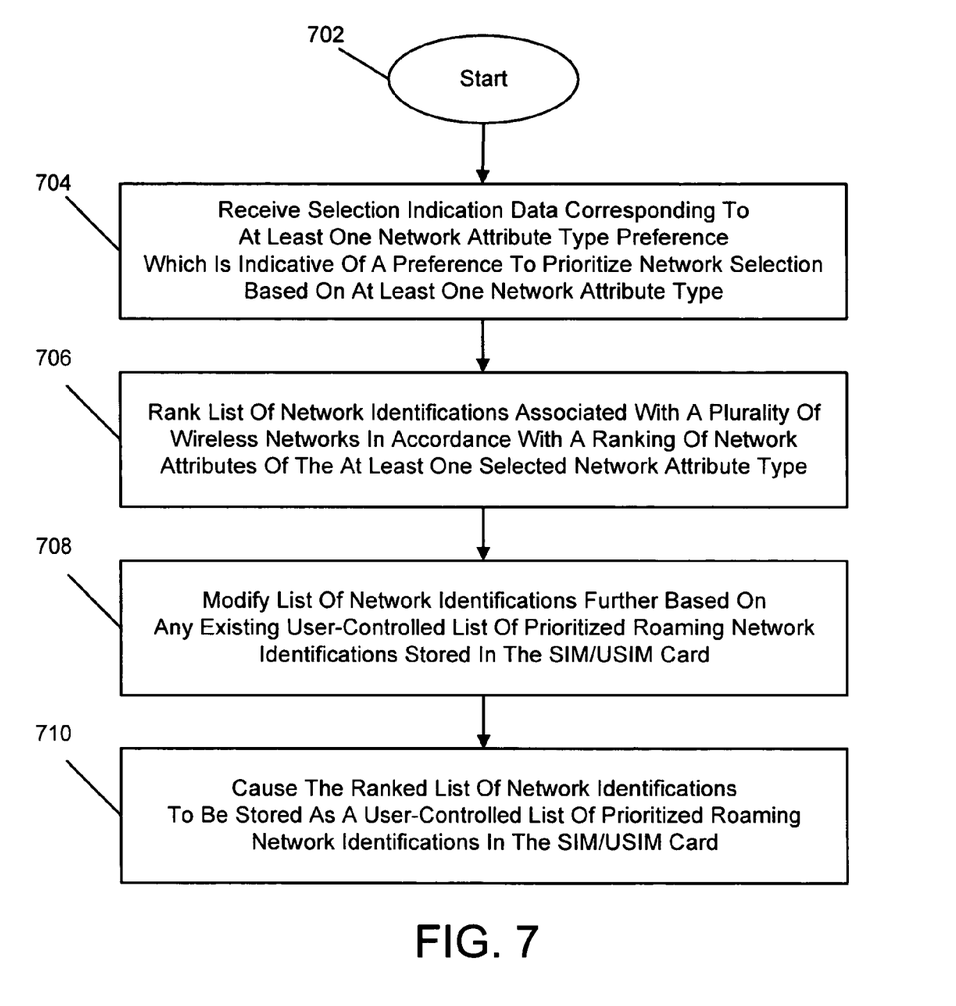
FIG. 7 is a flowchart for describing a user equipment method for producing the user-controlled list of prioritized roaming network identifications in the SIM/USIM card with use of the user agent application.

FIG. 7 is a flowchart for describing the user equipment method for producing the user-controlled list of prioritized roaming network identifications in with use of the user agent application. Note that the user equipment technique may be embodied as a computer program product which includes a computer readable medium and computer program instructions stored in the computer readable medium which are executable by one or more processors of the user equipment. As described above in relation to FIGS. 1-6, the user equipment includes mobile equipment and a removable UICC loaded with a SIM or USIM application ("SIM/USIM card") which stores a home network identification, a user-controlled list of prioritized roaming network identifications, and a operator-controlled list of prioritized roaming network identifications. The mobile equipment has a wireless transceiver; one or more processors coupled to the wireless transceiver; a UICC interface coupled to the one or more processors which execute the method.

Beginning at a start block 702 of FIG. 7, selection indication data corresponding to at least one of a plurality of network attribute type preferences are received (step 704 of FIG. 7). The at least one selected network attribute type preference is indicative of a preference to prioritize network selection based on at least one network attribute type of a plurality of network attributes types. This selection indication data corresponding to the selected network attribute type preference may be received through the user interface of the user equipment, through the user application, or both. Next, a list of network identifications associated with a plurality of wireless communication networks is ranked in accordance with a ranking of network attributes of the at least one selected network attribute type made available by the plurality of wireless communication networks, for thereby producing a ranked list of network identifications (step 706 of FIG. 7).

This is performed by the processor of the user equipment in response to receiving an indication from the user interface, for example, that the selection indication data has been entered. The initial list of network identifications may correspond to those wireless networks that are currently available in the geographic region within which the user equipment is operating (e.g. the list generated from a current scanning operation), or may include additional or other wireless networks which could become available.

Next, the ranked list of network identifications may be further modified based on any existing user-controlled list of prioritized roaming network identifications stored in the removable identity card (step 708 of FIG. 7). This preferable but optional step will be described further below in relation to a specific example. Next, the ranked list of network identifications is stored as a user-controlled list of prioritized roaming network identifications in the removable identity card (step 710 of FIG. 7). As described earlier above, this information may be stored in an elementary file (EF) referred to as or named PLMNwAcT or $EF_{PLMNwAcT}$ in a SIM/USIM card. Note that the list may further be copied into volatile or other usable memory of the user equipment for real-time use. Thereafter, the processor of the user equipment may perform an automatic network selection process with use of the user-controlled list of prioritized roaming network identifications.

Note that, after compiling the user preferred PLMN list it checks whether the RPLMN is the first on the list. If not, and there is any PLMN which is a better choice in the area, the user agent application triggers a manual PLMN re-selection for the end user.

As described in relation to step 708 of FIG. 7 above, the ranked list of network identifications may be modified further based on any existing list of user-controlled list of prioritized roaming network identifications stored in the SIM/USIM card. A more detailed algorithm for creating the PLMN preference list is now described. To create the list, there may be a need to combine the PLMN information already existing on the SIM/USIM card with the ranked list of PLMNs. The following algorithm may be utilized, which is merely an example of combining the two different sources of information. If the $EF_{PLMNwAcT}$ file on the SIM/USIM card is empty, the user preferred PLMN list with access technology compiled by the user agent application is copied into it. If the $EF_{PLMNwAcT}$ file is already populated on the SIM/USIM card, however, then the following steps are employed: (1) If two or more PLMNs have the same ranking on the user preferred PLMN list with access technology compiled by the user agent application and the old $EF_{PLMNwAcT}$ on the SIM/USIM card, they are saved in the same order in the new $EF_{PLMNwAcT}$ list as they are in the old one; (2) If some of the PLMNs are missing from the user preferred PLMN list with access technology compiled by the user agent application and they are on the old $EF_{PLMNwAcT}$ list, they are inserted at the end of the new $EF_{PLMNwAcT}$ list (if space is available); (3) If the ranking of a PLMN is different on the user preferred PLMN list with access technology compiled by the user agent application and in the old $EF_{PLMNwAcT}$ on the SIMIUSIM card, then the ranking on the user preferred PLMN list with access technology compiled by the user agent application gets into the new $EF_{PLMNwAcT}$ list.

A specific example of such a modified ranked list is provided below. From left to right below are (1) a ranked list of PLMNs (ranked in accordance with the user input and user application input); (2) the old user-controlled PLMN list; and (3) the newly produced user-controlled PLMN list which is based on the ranked list and the old user-controlled PLMN list using the algorithm above.

| Ranked List of PLMNs |
| --- |
| PLMN1, PLMN2, PLMN3 |
| PLMN4, PLMN5 |
| PLMN6, PLMN7 |
| PLMN8 |
| PLMN9 |
| Old $EF_{PLMNwAcT}$ |
| PLMN10 |
| PLMN3 |
| PLMN4 |
| PLMN2 |
| New $EF_{PLMNwAcT}$ |
| PLMN1 |
| PLMN3 |
| PLMN2 |
| PLMN4 |
| PLMN5 |
| PLMN6 |
| PLMN7 |
| PLMN8 |
| PLMN9 |
| PLMN10 |

Final Comments. Methods and apparatus for producing a user-controlled public land mobile network (PLMN) list for a Universal Integrated Circuit Card (UICC) loaded with a Subscriber Identity Module (SIM) or Universal Subscriber Identity Module (USIM) ("SIM/USIM card") with use of a user agent application are described. Selection indication data corresponding to at least one of a plurality of network attribute type preferences is received at the user agent application. The selection indication data may be received through a user interface of the user equipment (e.g. from the end user), a user application of the user equipment, or both. The at least one selected network attribute type preference is indicative of a preference to prioritize network selection based on at least one network attribute type of a plurality of network attributes types (e.g. cost, bandwidth, quality, number of available features, etc.). A list of network identifications associated with a plurality of wireless communication networks is then ranked in accordance with a ranking of network attributes of the at least one selected network attribute type made available by the plurality of wireless communication networks. The ranked list of network identifications is then stored as a user-controlled PLMN list in the SIM/USIM card. An automatic network selection process may then be performed with use of the user-controlled PLMN list. The above-described user equipment technique may be embodied as a computer program product which includes a computer readable medium and computer program instructions stored in the computer readable medium which are executable by one or more processors of the user equipment. The user equipment includes mobile equipment and the removable identity card which stores the home network identification, the user-controlled list of prioritized roaming network identifications, and the operator-controlled list of prioritized roaming network identifications. The mobile equipment has a wireless transceiver; one or more processors coupled to the wireless transceiver; a removable identity card interface coupled to the one or more processors which execute the method.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method in a mobile device for use in selecting a public land mobile network (PLMN) for communications, the mobile device being configured to access a removable identity card which stores a current user-controlled PLMN list, the current user-controlled PLMN list including a plurality of network identifications having a ranking, the mobile device including a user interface comprising a display, the method comprising:

storing an existing list of network identifications associated with a plurality of PLMNs that are available in a current location of the mobile device;

displaying a plurality of input selection options via the display, the plurality of input selection options corresponding to a plurality of selectable network attribute type preferences;

receiving, via the user interface, a selection of one of the input selection options provided via the display, the selected input selection option corresponding to one of the plurality of selectable network attribute type preferences, the selected network attribute type preference being indicative of a preference to prioritize network selection based on one of a plurality of network attributes types;

in response to receiving the selection of the selected input selection option via the user interface:

modifying, by the mobile device, a ranking of the network identifications in the existing list in accordance with a ranking of network attributes of the selected network attribute type which are attributed to the plurality of PLMNs, for producing a ranked list of network identifications associated with the plurality of PLMNs;

modifying, by the mobile device, the ranked list of network identifications based on the network identifications and rankings in the current user-controlled PLMN list, for producing a new user-controlled PLMN list which includes network identifications associated with a plurality of PLMNs that are available in the same current location of the mobile device;

replacing the current user-controlled PLMN list with the new user-controlled PLMN list in the removable identity card; and performing an automatic network selection process with use of the new user-controlled PLMN list for selecting a PLMN for communications.

2. The method of claim 1, wherein the selected network attribute type is associated with one of an available bandwidth or a monetary cost of use of a PLMN.

3. The method of claim 1, wherein the removable identity card comprises a subscriber identity module (SIM).

4. The method of claim 1, wherein the plurality of input selection options correspond to a plurality of selectable network attribute type preferences which comprise an available bandwidth and a monetary cost.

5. The method of claim 1, wherein the acts of modifying, creating, replacing, and performing are performed for each selected one of the input selection options provided via the display.

6. The method of claim 1, further comprising:
   receiving from a database a plurality of network attributes made available by each PLMN.

7. The method of claim 1, further comprising:
   performing a scanning operation; and
   wherein the existing list of network identifications corresponds to a list of network identifications received from the scanning operation.

8. The method of claim 1, wherein the act of modifying the ranked list further comprises:
   if a ranking of a network identification in the ranked list is different from the ranking of the network identification in the current user-controlled PLMN list, then ranking the network identification in the new user-controlled PLMN list with the ranking of the network identification in the ranked list.

9. A mobile device, comprising:

a wireless transceiver configured to provide communications via a public land mobile network (PLMN);

a processor coupled to the wireless transceiver;

memory for storing a user application which involves communications via the PLMN;

a user interface coupled to the processor;

a removable identity card interface coupled to the processor and configured to receive a removable identity card, the removable identity card including a current user-controlled PLMN list, the current user-controlled PLMN list including a plurality of network identifications having a ranking;

the processor being configured to:

store an existing list of network identifications which are associated with a plurality of PLMNs that are available in a current location of the mobile device;

display in the display a plurality of input selection options, the plurality of input selection options corresponding to a plurality of selectable network attribute type preferences;

receive, via the user interface a selection of one of the input selection options provided via the display, the selected input selection option corresponding to one of the plurality of selectable network attribute type preferences, the selected network attribute type preference being indicative of a preference to prioritize network selection based on one of a plurality of network attributes types;

in response to receiving the selection of the input selection option via the user interface:

modify a ranking of the network identifications in the existing list in accordance with a ranking of network attributes of the selected network attribute type which are attributed to the plurality of PLMNs, for producing a ranked list of network identifications associated with the plurality of PLMNs;

modify the ranked list of network identifications based on the network identifications and rankings in the current user-controlled PLMN list, for producing a new user-controlled PLMN list which includes network identifications associated with a plurality of PLMNs that are available in the same current location of the mobile device;

replace the current user-controlled PLMN list with the new user-controlled PLMN list in the removable identity card; and perform, with use of the wireless transceiver, an automatic network selection process with use of the new user-controlled PLMN list for selecting a PLMN for communications.

10. The mobile device of claim 9, wherein the processor is further configured to store the new user-controlled PLMN list in an elementary file (EF) referred to as PLMNwAcT of a Universal Integrated Circuit Card (UICC) having a Subscriber Identity Module (SIM) or Universal Subscriber Identity Module (USIM).

11. The mobile device of claim 9, wherein the processor is further configured to receive, through the wireless transceiver and from a database, a plurality of network attributes made available by each PLMN.

12. The mobile device of claim 9, wherein the processor is further operative to:
perform a scanning operation with use of the wireless transceiver; and
wherein the existing list of network identifications corresponds to a list of network identifications received from the scanning operation.

* * * * *